(12) United States Patent
Shimizu et al.

(10) Patent No.: US 6,796,567 B2
(45) Date of Patent: Sep. 28, 2004

(54) CABLE-TYPE STEERING DEVICE

(75) Inventors: Yasuo Shimizu, Saitama (JP); Atsuhiko Yoneda, Saitama (JP); Katsuji Watanabe, Saitama (JP); Koichi Suyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/266,101

(22) Filed: Oct. 7, 2002

(65) Prior Publication Data

US 2003/0080546 A1 May 1, 2003

(30) Foreign Application Priority Data

Oct. 16, 2001 (JP) ........................................ 2001-317683

(51) Int. Cl.[7] ................................................. B62D 7/16
(52) U.S. Cl. .................................. 280/93.502; 280/771
(58) Field of Search ............................ 280/93.502, 771, 280/778; 180/425, 426, 429, 430, 432, 443, 444; 74/496; 464/179, 183

(56) References Cited

U.S. PATENT DOCUMENTS 4,704,918 A * 11/1987 Orkin et al. .............. 74/579 R
5,598,897 A * 2/1997 Sugiura ...................... 180/417
6,053,274 A * 4/2000 Ehara et al. ................ 180/444

FOREIGN PATENT DOCUMENTS

| JP | 08-002431 | 1/1996 |
| JP | 10-059197 | 3/1998 |
| JP | 2000-025623 | 1/2000 |

* cited by examiner

Primary Examiner—Faye M. Fleming
(74) Attorney, Agent, or Firm—Carrier, Blackman & Associates, P.C.; Joseph P. Carrier; William D. Blackman

(57) ABSTRACT

A cable-type steering device in which a driving pulley coupled to a first pulley shaft connected to a steering wheel and a follower pulley coupled to a second pulley shaft connected to a steering gear box are connected to each other by operating cables, whereby a steering torque input to the steering wheel is transmitted through the operating cables to the steering gear box. At least one of transmission of a steering torque between the driving pulley and the first pulley shaft and transmission of a steering torque between the follower pulley and the second pulley shaft is carried out through a tapered coupling portion including a tapered surface formed on an outer periphery of at least one of the first and second pulley shafts and a tapered surface formed on an inner periphery of at least one of the driving pulley and the follower pulley.

10 Claims, 7 Drawing Sheets

CABLE-TYPE STEERING DEVICE

BACKGROUND OF THE INVENTION

1. Field of the Invention

The present invention relates to a cable-type steering device in which a steering wheel and a steering gear box are connected to each other by easily-flexible operating cables such as Bowden cables.

2. Discussion of Background Art

A conventional cable-type steering device is known, for example, from Japanese Patent Application Laid-open Nos. 2000-25623, 10-59197 and 8-2431.

In these cable-type steering devices, a driving pulley, a follower pulley and pulley shafts are generally constituted by separate members, and a pulley boss and the pulley are relatively non-rotatably coupled to each other at a serration-coupling portion or a spline-coupling portion.

However, a slight play or looseness provided in the serration-coupling portion or the spline-coupling portion in order to absorb a misalignment between the pulley and the pulley shaft, brings about the following problems: the pulley is vibrated relative to the pulley shaft due to the vibration transmitted from wheels which causes a noise, and a steering feeling is deteriorated during operation of the steering wheel.

SUMMARY OF THE INVENTION

The present invention has been accomplished with such circumstance in view, and it is an object of the present invention to eliminate the play or looseness between the pulley and the pulley shaft in the cable-type steering device, to prevent noise and deterioration in steering feeling.

To achieve the above object, according to a first aspect of the present invention, there is provided a cable-type steering device in which a driving pulley coupled to a first pulley shaft connected to a steering wheel and a follower pulley coupled to a second pulley shaft connected to a steering gear box are connected to each other by operating cables, whereby a steering torque input to the steering wheel is transmitted through the operating cables to the steering gear box, wherein at least one of transmission of a steering torque between the driving pulley and the first pulley shaft and transmission of a steering torque between the follower pulley and the second pulley shaft is carried out through a tapered coupling portion of a tapered surface formed on an outer periphery of at least one of the first and second pulley shafts and a tapered surface formed on an inner periphery of at least one of the driving pulley and the follower pulley.

With the above arrangement, the transmission of the steering torque between the driving pulley and the pulley shaft of the driving pulley or the transmission of the steering torque between the follower pulley and the pulley shaft of the follower pulley is carried out through the tapered coupling portion of the tapered surface of the pulley shaft and the tapered surface of the pulley. Therefore, it is possible to eliminate the play provided when such transmission is carried out through the serration-coupling portion or the spline-coupling portion, thereby bringing the pulley shaft and the pulley into close contact with each other without a gap. Thus, in contrast to conventional cable-type steering devices it is possible to prevent a noise from being generated from the driving pulley or the follower pulley due to the vibration of a vehicle body, and to prevent a play in the steering wheel from increasing to deteriorate the steering feeling.

According to a second aspect of the present invention, in addition to the arrangement of the first aspect, the pulley having the tapered surface is axially movably supported in a casing so that such pulley is axially biased by a nut screwed over the pulley shaft having the tapered surface, thereby coupling the pulley shaft having the tapered surface and the pulley having the tapered surface in close contact with each other at the tapered coupling portion.

With the above arrangement, each of the pulleys having a tapered surface can be axially biased by a load of the nut screwed over the corresponding pulley shaft having a tapered surface without an excessive load acting on the pulley casing, to strongly couple the pulley shaft and the pulley in close contact with each other at the tapered coupling-portion, so that they do not slip relative to each other.

A driving pulley casing 12 and a follower pulley casing 14 in an embodiment correspond to the pulley casings of the present invention.

DETAILED DESCRIPTION OF THE INVENTION

A mode for carrying out the present invention will now be described by way of an embodiment of the present invention shown in the accompanying drawings.

Figure 1:
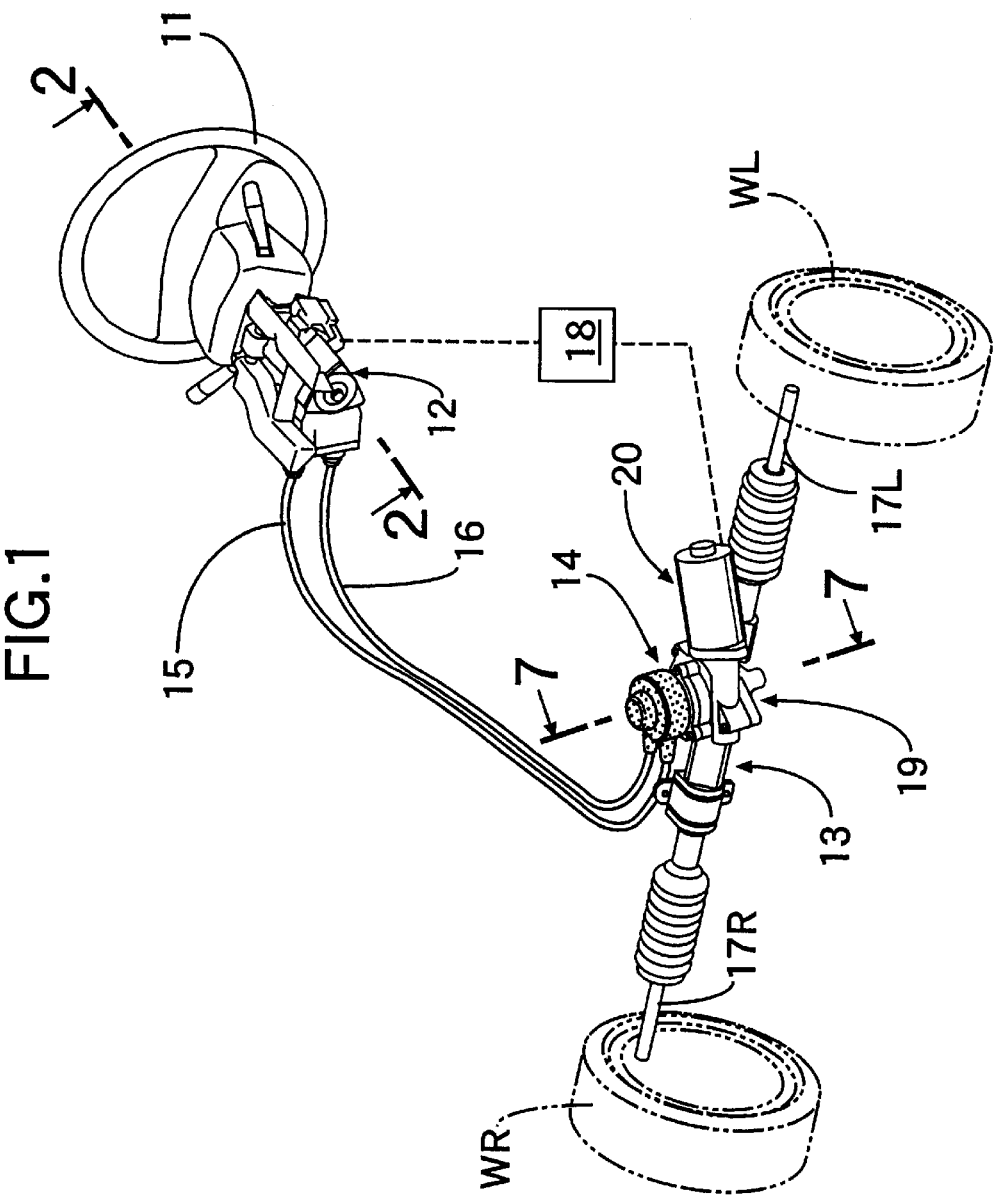
FIG. 1 is a perspective view of the entire arrangement of a cable-type steering device according to an embodiment of the invention.
Figure 2:
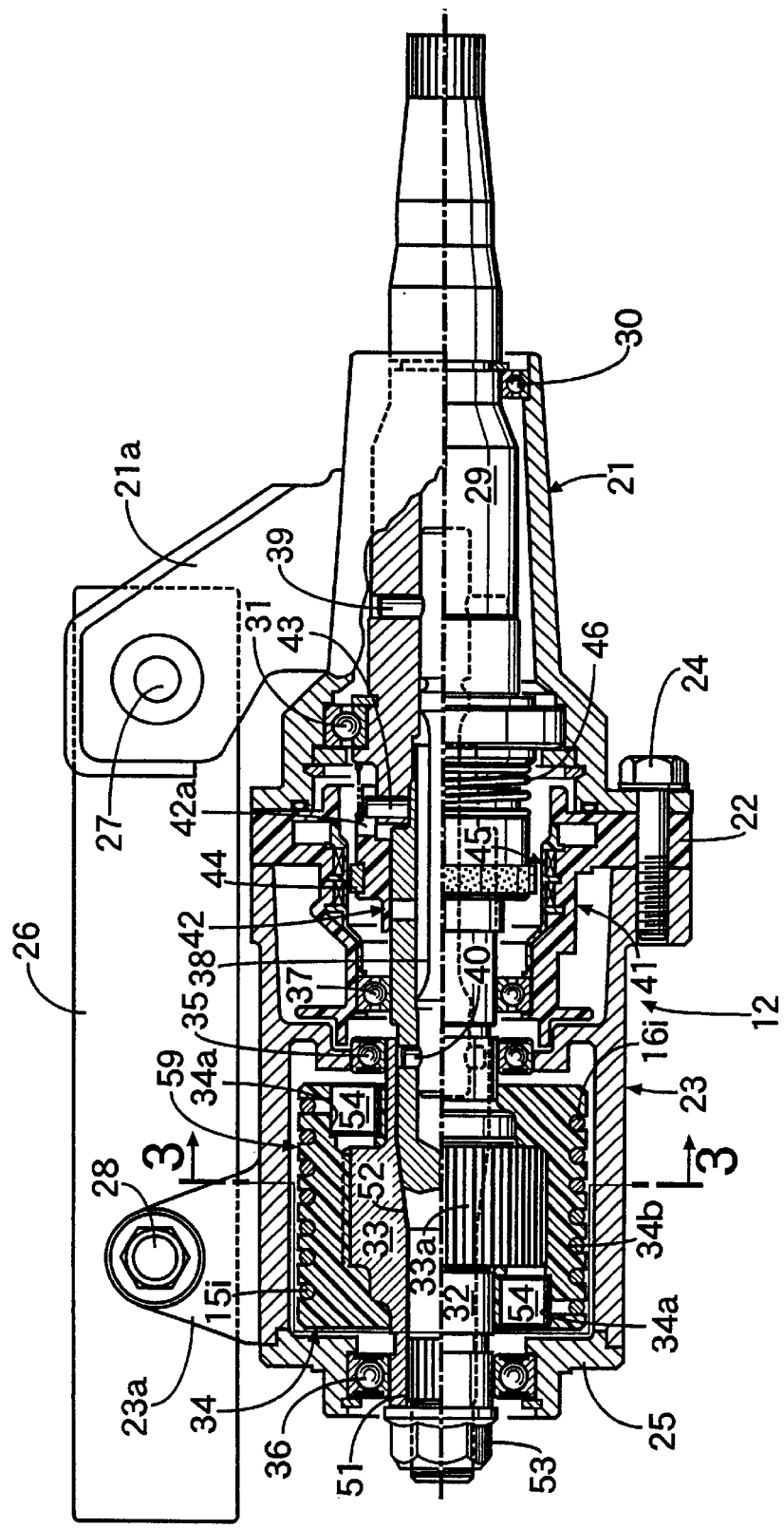
FIG. 2 is an enlarged sectional view taken along a line 2—2 in FIG. 1.
Figure 3:
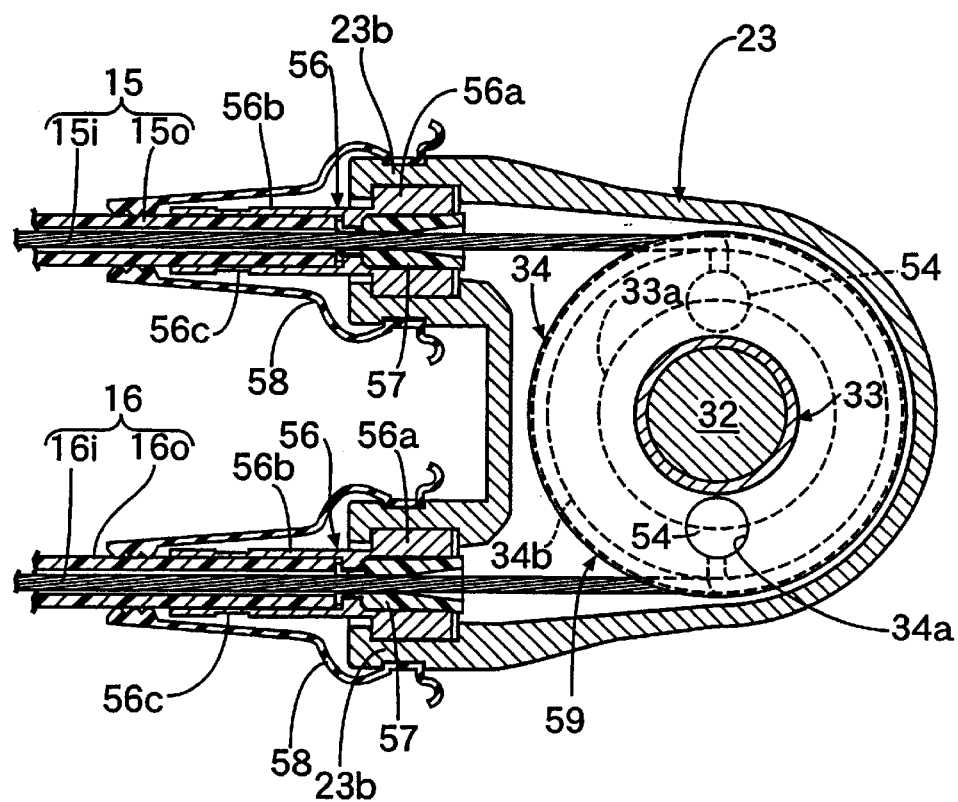
FIG. 3 is a sectional view taken along a line 3—3 in FIG. 2.
Figure 4:
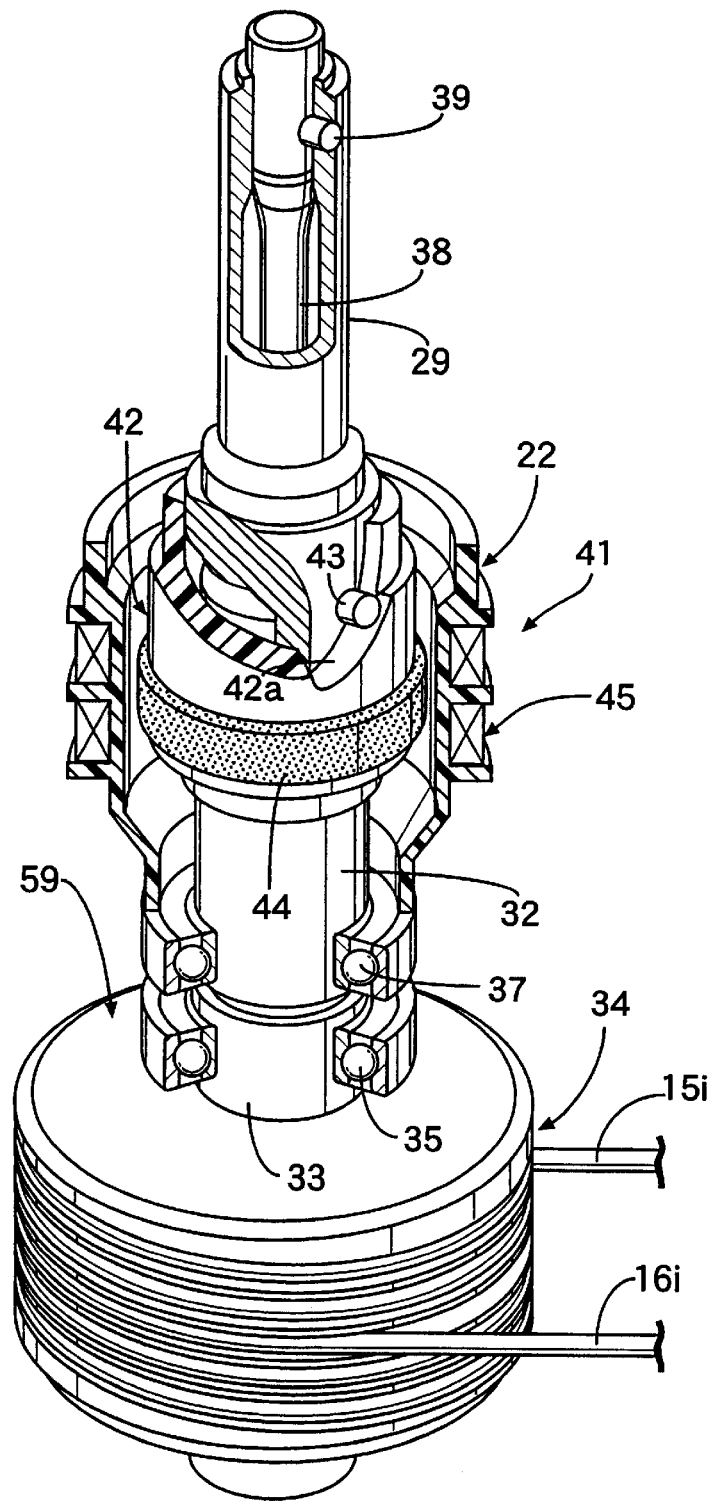
FIG. 4 is a perspective view of a steering torque sensor.
Figure 5:
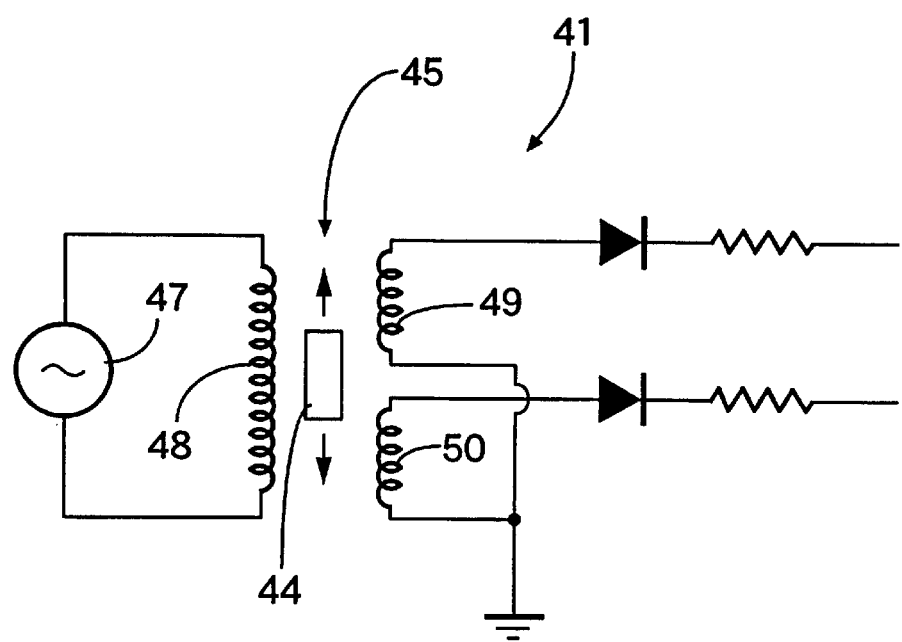
FIG. 5 is a circuit diagram of a differential transformer of the steering torque sensor according to the invention.
Figure 6A:
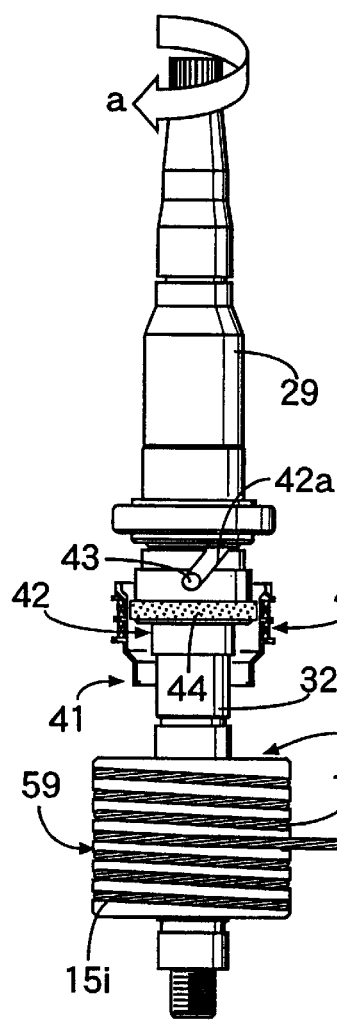
FIGS. 6A, 6B and 6C are views for explaining the operation of the steering torque sensor.
Figure 6B:
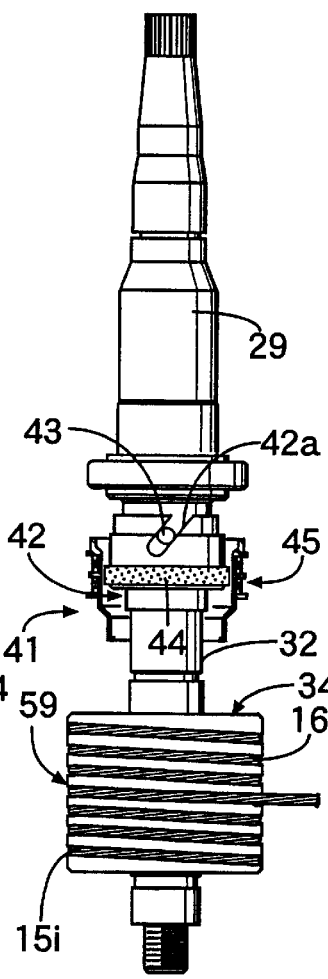
Figure 6C:
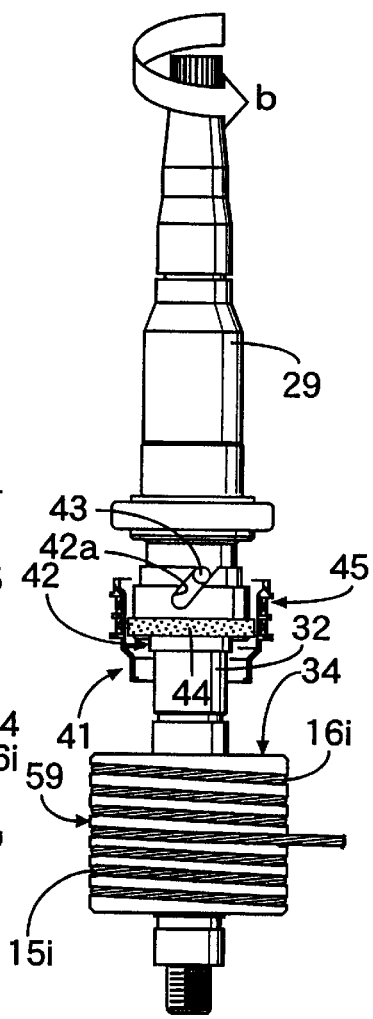
Figure 7:
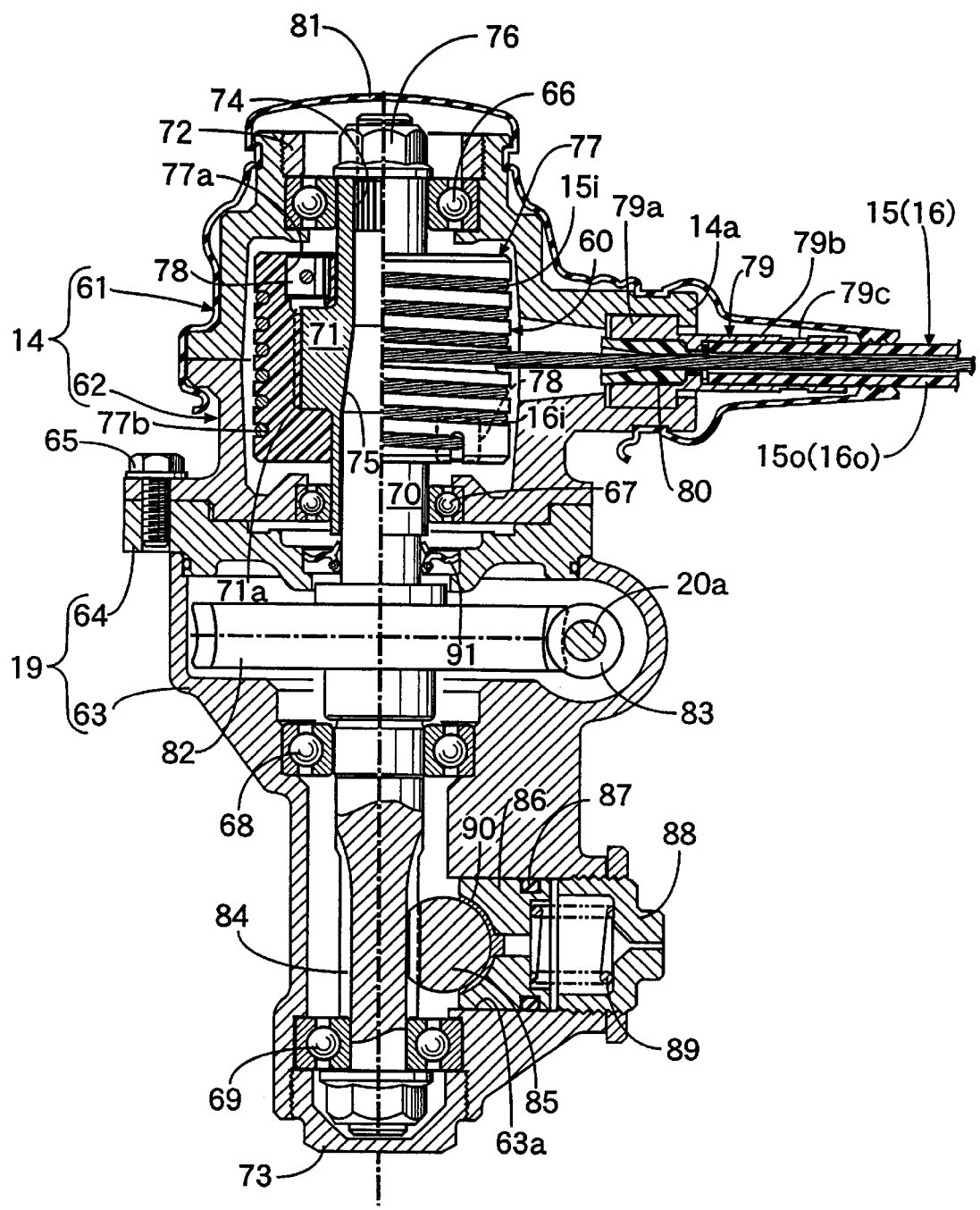
FIG. 7 is an enlarged sectional view taken along a line 7—7 in FIG. 1.

FIGS. 1 to 7 show an embodiment of the present invention. FIG. 1 is a perspective view of the entire arrangement of a cable-type steering device according to an embodiment of the invention; FIG. 2 is an enlarged sectional view taken along a line 2—2 in FIG. 1; FIG. 3 is a sectional view taken along a line 3—3 in FIG. 2; FIG. 4 is a perspective view of a steering torque sensor; FIG. 5 is a circuit diagram of a differential transformer of the steering torque sensor according to the invention; FIGS. 6A, 6B and 6C are views for explaining the operation of the steering torque sensor; and FIG. 7 is an enlarged sectional view taken along a line 7—7 in FIG. 1.

As shown in FIG. 1, a driving pulley casing 12 mounted in front of a steering wheel 11 of an automobile and a follower pulley casing 14 mounted above a steering gear box 13, are connected to each other by two operating cables 15 and 16 each comprising a Bowden cable. Tie rods 17L and 17R extending in a lateral direction of a vehicle body from opposite ends of the steering gear box 13 are connected to knuckles (not shown) which support left and right wheels WL and WR. A steering torque sensor for detecting a steering torque input to the steering wheel 11 is accommodated in the driving pulley casing 12. An actuator 20 mounted on a gear casing 19 integral with the follower pulley casing 14 is operated by a command from a control unit 18 to which a detected steering torque is input, thereby assisting the steering operation conducted by a driver.

As shown in FIG. 2, the driving pulley casing 12 comprises a rear housing 21, a center housing 22 and a front housing 23 which are coupled together by bolts 24. A front cover 25 is coupled to a front face of the front housing 23 by a bolt which is not shown. In the driving pulley casing 12, a bracket 21a mounted on the rear housing 21 is fixed to a mounting stay 26 by a pin 27, and a bracket 23a mounted on the front housing 23 is fixed to the mounting stay 26 by a bolt 28.

A hollow steering shaft 29 connected to the steering wheel 11 is rotatably supported in the rear housing 21 with two ball bearings 30 and 31. A pulley boss 33 made of a metal is fixed to an outer periphery of a hollow pulley shaft 32 which is disposed coaxially with the steering wheel 11. A driving pulley body 34 made of a synthetic resin is integrally molded to cover a serration 33a formed on an outer periphery of the pulley boss 33. The pulley boss 33 is rotatably supported at its opposite ends on the front housing 23 and the front cover 25 by two ball bearings 35 and 36, respectively. The pulley shaft 32 is rotatably supported in the center housing 22 with a ball bearing 37. The pulley boss 33 and the driving pulley body 34 constitute a driving pulley 59 of the present invention.

An inner periphery of a front end of the steering shaft 29 is relatively rotatably fitted to an outer periphery of a rear end of the pulley shaft 32. Opposite ends of a torsion bar 38 are fitted into and coupled to a hollow of the steering shaft 29 and a hollow of the pulley shaft 32 by pins 39 and 40, respectively. Therefore, a steering torque input to the steering shaft 29 is transmitted from the steering shaft 29 through the torsion bar 38 to the pulley shaft 32. The steering torque sensor 41 mounted in the center housing 22 detects the steering torque, based on an amount by which the torsion bar 38 is twisted.

As can be seen from FIGS. 2 and 4, the steering torque sensor 41 includes a cylindrical slider 42 which is relatively non-rotatably and axially slidably carried on an outer periphery of the pulley shaft 32; a guide pin 43 fixed to the steering shaft 29 and fitted in an inclined groove 42a defined in the slider 42; a magnetic ring 44 fixed on an outer periphery of the synthetic resin slider 42; a differential transformer 45 fixed to an inner periphery of the center housing 22 and opposed to the magnetic ring 44; and a coil spring 46 for biasing the slider 42 forwards to prevent a play between the guide pin 43 and the inclined groove 42.

As shown in FIG. 5, the differential transformer 45 of the steering torque sensor 41 includes a primary coil 48 connected to an AC power source 47, a first secondary coil 49 and a second secondary coil 50. The magnetic ring 44 constitutes a movable core disposed between the first and second secondary coils 49 and 50.

As can be seen from FIG. 2, a front end of the pulley shaft 32 and the pulley boss 33 are coupled to each other at a serration coupling portion 51 and through a tapered coupling portion 52 which is tapered toward the front end of the pulley shaft 32. A nut 53 is screwed over the front end of the pulley shaft 32, and its load biases the pulley boss 33 rearwards along the pulley shaft 32 so that the pulley shaft 32 and the pulley boss 33 are strongly integrally coupled to each other under a sufficient surface pressure via the tapered coupling portion 52. Thus, it is possible to overcome an influence of a very small play existing in the serration coupling portion 51 to inhibit the generation of a noise, and also to improve a steering feeling. Because the driving pulley 59 can be moved axially when the nut 53 is tightened, an excessive load is prevented from acting on the driving pulley casing 12.

As can be seen from FIGS. 2 and 3, each of the two operating cables 15 and 16 is comprised of an outer tube 15o, 16o made of a synthetic resin, and inner cables 15i, 16i made of stranded metal wires slidably accommodated in the outer tube 15o, 16o. Short columnar pins 54, 54 fixed to ends of the two inner cables 15i and 16i are fitted in pinholes 34a, 34a defined in opposite end faces of the driving pulley body 34. The two inner cables 15i, 16i are wound in directions toward each other along a single spiral groove 34b defined in the outer periphery of the driving pulley body 34, and is then drawn out in a direction perpendicular to an axis of the pulley shaft 32.

Bottoms of the pinholes 34a, 34a in the driving pulley body 34 made of the synthetic resin reach a border between the serration 33a of the pulley boss 33 and the driving pulley body 34. In a state in which the pins 54, 54 are removed, the border can be visually observed with ease. Therefore, it is possible to reliably find a processing error such as that the driving pulley body 34 is molded in an inappropriate state in which there is no serration 33a formed on the pulley boss 33.

Two cylindrical connections 23b, 23b are formed on the front housing 23, and boss portions 56a, 56a of outer tube coupling members 56, 56 are fixed within the connections 23b, 23b. Pipe portions 56b, 56b extending from the boss portions 56a, 56a to the outside of the connections 23b, 23b are fitted over outer peripheries of the outer tubes 15o and 16o. Ends of the outer tubes 15o, 16o are fixed to the front housing 23 by caulking caulk portions 56c, 56c. Guide bushes 57, 57 made of a synthetic resin and having a good slipperiness are retained on inner peripheries of the boss portions 56a, 56a of the outer tube coupling members 56, 56 in order to prevent the inner cables 15i and 16i and the boss portions 56a, 56a from being rubbed directly against each other.

Rubber covers 58, 58 cover portions of the outer tubes 15o and 16o of the operating cables 15 and 16 between the outer peripheries of the connections 23b, 23b of the front housing 23 and predetermined positions (e.g., portions exposed from the pipe portions 56b, 56b of the outer tube coupling members 56, 56). The rubber covers 58, 58 having an elasticity are in close contact with the outer peripheries of the connections 23b, 23b of the front housing 23 and the outer peripheries of the outer tubes 15o and 16o to seal them, so that it is possible to prevent moisture from entering from gaps between the connections 23b, 23b and the caulk portions 56c, 56c of the outer tube coupling members 56, 56 for coupling the outer tubes 15o and 16o to the front housing 23 as well as the boss portions 56a, 56a of the outer tube coupling members 56, 56.

In the front cover 25 and the front housing 23 which accommodate the driving pulley 59, because the two ball bearings 35 and 36 supporting the pulley boss 33 are of a water proofing type, there is no possibility that water is leaked from the driving pulley 59. In this manner, the driving pulley 59 and the portions of the outer tubes 15o and 16o extending from the driving pulley 59 to the predetermined positions, are accommodated in a sealed space. Therefore, not only when the driving pulley casing 12 is disposed in an engine room and receives water splashed thereon from a road surface, but also when the driving pulley casing 12 is disposed in a vehicle compartment and receives drinking water spilled by an occupant, it is possible to prevent the water from being deposited on the slide portions of the outer tubes 15o and 16o and the inner cables 15i and 16i where it could be frozen at a low temperature to impede the smooth movement of the operating cables 15 and 16, and to also prevent the inner cables 15i and 16i from being rusted which could cause a deterioration in durability of the operating cables 15 and 16.

As shown in FIG. 7, the follower pulley casing 14 is comprised of an upper housing 61 and a lower housing 62 which are coupled to each other by a bolt (not shown). The gear casing 19 is comprised of a gear casing body 63 and an upper cover 64 which is coupled to an upper surface of the gear casing body 63 by a bolt (not shown). The lower housing 62 and the upper cover 64 are coupled to each other by a plurality of bolts 65.

A pulley shaft 70 is rotatably supported on a ball bearing 66 mounted on the upper housing 61, a ball bearing 67 mounted on the lower housing 62 and two ball bearings 68 and 69 mounted on the gear casing body 63. The upper two ball bearings 66 and 67 do not directly support the pulley shaft 70, but support a pulley boss 71 fixed to an outer periphery of the pulley shaft 70. The ball bearing 66 mounted on the upper housing 61 is prevented from slipping off by an annular nut 72. The lower ball bearing 69 mounted on the gear casing body 63 is prevented from slipping off by a cap nut 73.

An upper end of the pulley shaft 70 and the pulley boss 71 are coupled to each other at a serration coupling portion 74 and through a tapered coupling portion 75 which is tapered toward an upper end of the pulley shaft 70. A nut 76 is screwed over the upper end of the pulley shaft 70, and its load biases the pulley boss 71 rearwards along the pulley shaft 70 so that the pulley shaft 70 and the pulley boss 71 are strongly integrally coupled to each other under a sufficient surface pressure via the tapered coupling portion 75. Thus, it is possible to overcome an influence of a very small play existing in the serration coupling portion 74 to inhibit the generation of a noise, but also to improve a steering feeling. Because the follower pulley 60 can be moved axially when the nut 76 is tightened, an excessive load is prevented from acting on the follower pulley casing 14 and the gear casing 19.

A follower pulley body 77 made of a synthetic resin is integrally molded on a serration 71a around an outer periphery of the pulley boss 71, and short columnar pins 78, 78 fixed to the ends of the inner cables 15i and 16i of the two operating cables 15 and 16 are fitted into pinholes 77a, 77a defined in opposite end faces of the follower pulley body 77. The two inner cables 15i and 16i extending from the pins 78, 78 are wound in directions toward each other along a single spiral groove 77b defined in the outer periphery of the follower pulley body 77 and then drawn out in a direction perpendicular to an axis of the pulley shaft 70. The pulley boss 71 and the follower pulley body 77 constitute the follower pulley 60 of the present invention.

Bottoms of the pinholes 77a, 77a in the follower pulley body 77 made of the synthetic resin reach a border between the serration 71a of the pulley boss 71 and the follower pulley body 77. In a state in which the pins 78, 78 are removed, the border can be visually observed with ease. Therefore, it is possible to reliably find a processing error such as that the driving pulley body 34 is molded in an inappropriate state in which there is no serration 71a formed on the pulley boss 71.

Two cylindrical connections 14a, 14a are formed on the follower pulley casing 14, and boss portions 79a, 79a of outer tube coupling members 79, 79 are fixed within the connections 14a, 14a. Pipe portions 79b, 79b extending from the boss portions 79a, 79a to the outside of the connections 14a, 14a, are fitted over the outer peripheries of the outer tubes 15o and 16o. Ends of the outer tubes 15o and 16o are fixed to the follower pulley casing 14 by caulking caulk portions 79c, 79c. Guide bushes 80, 80 made of a synthetic resin and having a good slipperiness are retained on inner peripheries of the boss portions 79a, 79a of the outer tube coupling members 79, 79 in order to prevent the inner cables 15i and 16i and the boss portions 79a, 79a from being rubbed directly against each other.

A single rubber cover 81 covers portions of the outer tubes 15o and 16o of the operating cables 15 and 16 between substantially the entire follower pulley casing 14 via the connections 14a, 14a and predetermined positions (e.g., portions exposed from the pipe portions 79b, 79b of the outer tube coupling members 79, 79). The rubber cover 81 ensures not only that the caulk portions 79c, 79c of the outer tube coupling members 79, 79 into which moisture is most liable to enter can be reliably sealed, but also that moisture can be inhibited from entering from parting faces of the upper housing 61 and the lower housing 62 of the follower pulley casing 14 and from the ball bearing 66 supporting the upper end of the pulley shaft 70.

Thus, it is possible to enhance the water-proofing property of the follower pulley casing 14 disposed in a lower portion of the engine room and more liable to be wet with water than the driving pulley casing 12; to prevent moisture from being deposited on the slide portions of the outer tubes 15o and 16o and the inner cables 15i and 16i where it could be frozen at a low temperature to impede the smooth movement of the operating cables 15 and 16, and to also prevent the inner cables 15i and 16i from being rusted which could cause a deterioration in durability of the operating cables 15 and 16.

A worm wheel 82 fixed to the pulley shaft 70 and a worm 83 fixed to an output shaft 20a of the actuator 20 (see FIG. 1) comprising an electric motor, are meshed with each other at an upper portion of the gear casing 19 sealed from the follower pulley casing 14 via a seal member 91. A rack 85 of the steering gear box 13 (see FIG. 1) is meshed with a pinion 84 formed at a lower portion of the pulley shaft 70, and is biased at its meshed portion toward the pinion 84.

More specifically, a slide member 86 is slidably fitted into a through-bore 63a defined in the gear casing body 63 via an O-ring 87 interposed therebetween. A low-friction member 90 mounted on the slide member 86 is put into abutment against a back of the rack 85 by a repulsive force of a coil spring 89 disposed between a spring seat 88 threadedly coupled into the through-bore 63a and the slide member 86. Thus, when the rotation of the pulley shaft 70 is transmitted through the pinion 84 to the rack 85 to steer the wheels Wf, Wf, the rack 85 can be operated smoothly without receiving a large resistance against sliding while being prevented from being loosened and flexed.

The operation of the embodiment of the present invention having the above-described arrangement will be described below.

A steering torque detected by the steering torque sensor 41 is input to the control unit 18, and the control unit 18 controls the operation of the actuator 20 based on the steering torque. More specifically, when the steering wheel 11 is operated to turn the vehicle, a steering torque is transmitted through the steering shaft 29 and the torsion bar 38 to the pulley shaft 32; the inner cable 15i, 16i of one of the operating cables 15 and 16 wound around the driving pulley body 34 is pulled, and the other inner cable 15i, 16i is loosened, as shown in FIG. 2; whereby the rotation of the driving pulley 59 is transmitted to the follower pulley 60. As a result, the pulley shaft 70 shown in FIG. 7 is rotated, so that a steering torque is transmitted through the pinion 84, the rack 85 and the tie rods 17L and 17R within the steering gear box 13 to the wheels WL and WR.

When no steering torque is input to the steering wheel 11, the torsion bar 38 is not twisted and the steering shaft 29 and the pulley shaft 32 are retained at the same phases. The guide pin 43 of the steering shaft 29 is located at a central portion of the inclined groove 42a, and the slider 42 is retained in a vertically central position, as shown in FIG. 6B. At this time, the magnetic ring 44 mounted on the slider 42 is located in a position halfway between the first secondary coil 49 and the second secondary coil 50, as shown in FIG. 5, and the voltages output from both the secondary coils 49 and 50 are equalized to each other, whereby the steering torque is detected as being zero.

When the steering wheel 11 is operated rightwards, whereby a steering torque in a direction of an arrow a in FIG. 6A is input to the steering shaft 29, the torsion bar 38 is twisted to generate a difference in phase between the steering shaft 29 and the pulley shaft 32 (i.e., the slider 42 non-rotatable relative to the pulley shaft 32), so that the guide pin 43 of the steering shaft 29 pushes the inclined groove 42a to slide the slider 42 upwards. As a result, the voltage output from the upper first secondary coil 49 is increased, the voltage output from the lower second secondary coil 50 is decreased, and a steering torque in a rightward steering direction is detected based on a difference between such voltages. When the steering wheel 11 is operated leftwards, whereby a steering torque is input to the steering shaft 29 in a direction of an arrow b in FIG. 6C, the torsion bar 38 is twisted to generate a difference in phase between the steering shaft 29 and the pulley shaft 32 (i.e., the slider 42), so that the guide pin 43 of the steering shaft 29 pushes the inclined groove 42a to slide the slider 42 downwards. As a result, the voltage output from the upper first secondary coil 49 is decreased, the voltage output from the lower second secondary coil 50 is increased, and a steering torque in a leftward steering direction is detected based on a difference between such voltages.

When the steering torque is detected in the above manner by the steering torque sensor 41, the control unit 18 drives the actuator 20 so that the steering torque detected by the steering torque sensor 41 is maintained at a preset value. Thus, a torque of the actuator 20 is transmitted through the worm 83 and the worm wheel 82 to the pulley shaft 70, and the steering operation conducted by the driver is assisted. A combination of the steering torque sensor 41 having the differential transformer 45 and the actuator 20 ensures that the actuator 20 can be operated by only an electric control operation, leading to a simple structure of a control system.

Although the embodiment of the present invention has been described in detail, it will be understood that various modifications in design may be made without departing from the subject matter of the present invention.

For example, the driving pulley body 34 and the pulley boss 33 are constituted by separate members, and the follower pulley body 77 and the pulley boss 71 are constituted by separate members in the embodiment, but the pulley body 34 or 77 and associated pulley boss 33 or 71 may be constituted by a single member.

Also, while the disclosed embodiment includes serration couplings, it is possible to use other type of couplings such as spline couplings.

Further, while the disclosed embodiment includes tapered coupling portions associated with both the driving pulley and the follower pulley, it is possible to include only one tapered coupling portion associated with only one of the pulleys.

As discussed above, according to the first aspect of the present invention, the transmission of the steering torque between the driving pulley and the pulley shaft of the driving pulley and/or the transmission of the steering torque between the follower pulley and the pulley shaft of the follower pulley is carried out through to tapered coupling portions of the tapered surface of the pulley shaft and the mating tapered surface of the associated pulley. Therefore, it is possible to eliminate the play generated when such transmission is carried out through a serration-coupling portion or a spline-coupling portion, thereby bringing the pulley shaft and the pulley into close contact with each other without a gap. Correspondingly, it is possible to prevent a noise from being generated from the driving pulley or the follower pulley as otherwise conventionally caused by the vibration of the vehicle body, and to prevent to play of the steering wheel from being increased which would deteriorate the steering feeling.

According to the second aspect of the present invention, each of the pulleys can be axially biased by the load of the nut screwed over the pulley shaft without an excessive load acting on the pulley casing, to couple the pulley shaft and the pulley in close contact with each other at the tapered coupling-portion, whereby the pulley shafts and the corresponding pulleys can be coupled strongly to each other so that they do not slip relative to each other.

What is claimed is:

1. A cable steering device in which a driving pulley coupled to first a pulley shaft connected to a steering wheel and a follower pulley coupled to a second pulley shaft connected to a steering gear box are connected to each other by operating cables, whereby a steering torque input to the steering wheel is transmitted through the operating cables to the steering gear box, wherein at least one of a transmission of a steering torque between the driving pulley and the first pulley shaft and a transmission of a steering torque between the follower pulley and the second pulley shaft is carried out through a tapered coupling portion of a tapered surface formed on an outer periphery of at least one of the first and second pulley shafts and a tapered surface formed on an inner periphery of at least one of the driver pulley and the follower pulley.

2. A cable steering device according to claim 1, wherein the pulley having the tapered surface is axially movably supported in a casing so that the pulley having the tapered surface is axially biased by a nut screwed over the pulley shalt having the tapered surface, thereby coupling the pulley shaft having the tapered surface and the pulley having the tapered surface in close contact with each other at the tapered coupling portion.

3. A cable steering device according to claim 1, wherein both the transmission of the steering torque between the driving pulley and the first pulley shalt and the transmission of the steering torque between the follower pulley and the second pulley shaft are carried out through corresponding tapered coupling portions.

4. A cable steering device according to claim 1, wherein said at least one of said driving pulley and said follower pulley having the tapered surface formed on the inner periphery thereof comprises a pulley body and a pulley boss connected together through one of a serration coupling and a spline coupling, said pulley boss having the tapered surface formed on the inner periphery thereof.

5. A cable steering device comprising:

a driving pulley coupled to first a pulley shaft connected to a steering wheel;

a follower pulley coupled to a second pulley shaft connected to a steering gear box;

operating cables operatively connecting the driving and follower pulleys to each other whereby a steering torque input to the steering wheel is transmitted through the operating cables to the steering gear box; and a tapered coupling portion being disposed in at least one of a transmission path defined between the driving pulley and the first pulley shaft and a transmission path defined between the follower pulley and the second pulley shaft, said tapered coupling portion comprising at least one of a tapered surface formed on an outer periphery of at least one of the first and second pulley shafts and a mating tapered surface formed on an inner periphery of at least one of the driver pulley and the follower pulley.

6. A cable steering device according to claim 5, wherein said pulley having the tapered surface is axially movably supported in a easing so that the pulley having the tapered surface is axially biased by a fastener provided on the pulley shaft having the tapered surface, thereby coupling the pulley shaft having the tapered surface and the pulley having the tapered surface in close contact with each other at the tapered coupling portion.

7. A cable steering device according to claim 5, including two of said tapered coupling portions respectively disposed in the transmission path defined between the driving pulley and the first pulley shaft and the transmission path defined between the follower pulley and the second pulley shaft.

8. A cable steering device according to claim 5, wherein said at least one of said driving pulley and said follower pulley having the tapered surface formed on the inner periphery thereof comprises a pulley body arid a pulley boss connected together through one of a serration coupling and a spline coupling, said pulley boss having the tapered surface formed on the inner periphery thereof.

9. A cable steering device according to claim 1, wherein the pulley having the tapered surface is axially movably biased on the pulley shaft having the tapered surface so that the pulley shaft having the tapered surface and the pulley having the tapered surface are maintained in close contact with each other at the tapered coupling portion.

10. A cable steering device according to claim 5, wherein the pulley having the tapered surface is axially movably biased on the pulley shaft having the tapered surface so that the pulley shaft having the tapered surface and the pulley having the tapered surface are maintained in close contact with each other at the tapered coupling portion.

* * * * *

UNITED STATES PATENT AND TRADEMARK OFFICE
CERTIFICATE OF CORRECTION

PATENT NO. : 6,796,567 B2  Page 1 of 1
APPLICATION NO. : 10/266101
DATED : May 7, 2007
INVENTOR(S) : Shimizu et al.

It is certified that error appears in the above-identified patent and that said Letters Patent is hereby corrected as shown below:

Column 8, line 53, claim 2, at the beginning of the line, before "having the tapered surface", change "shalt" to --shaft--;

Line 59, claim 3, between "the first pulley" and "and the transmission", change "shalt" to --shaft--.

Column 9, line between 25 and 26, claim 6, between "supported in a" and "so that the" change "easing" to --casing--.

Column 10, line between 11 and 12, claim 8, between "pulley body" and "a pulley boss", change "arid" to --and--.

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 6,796,567 B2
APPLICATION NO. : 10/266101
DATED : September 28, 2004
INVENTOR(S) : Shimizu et al.

It is certified that error appears in the above-identified patent and that said Letters Patent is hereby corrected as shown below:

Column 8, line 53, claim 2, at the beginning of the line, before "having the tapered surface", change "shalt" to --shaft--;

Line 59, claim 3, between "the first pulley" and "and the transmission", change "shalt" to --shaft--.

Column 9, line between 25 and 26, claim 6, between "supported in a" and "so that the" change "easing" to --casing--.

Column 10, line between 11 and 12, claim 8, between "pulley body" and "a pulley boss", change "arid" to --and--.

This certificate supersedes Certificate of Correction issued July 17, 2007.

Signed and Sealed this

Fourth Day of September, 2007

JON W. DUDAS
*Director of the United States Patent and Trademark Office*